United States Patent [19]
Niesen

[11] 3,916,047
[45] Oct. 28, 1975

[54] COATED STEEL FORM FOR USE IN A CORELESS INDUCTION FURNACE

[76] Inventor: Raymond J. Niesen, 2034 Hycroft Drive, Pittsburgh, Pa. 15241

[22] Filed: Aug. 21, 1973

[21] Appl. No.: 390,254

[52] U.S. Cl. .................. 428/35; 13/35; 106/57; 106/58; 106/63; 106/66; 264/30; 266/43; 428/450; 428/472
[51] Int. Cl.² ............... C21C 5/44; C04B 35/12; C04B 35/20; C04B 35/48
[58] Field of Search.......... 117/94, 169 R, 127, 5.3, 117/129; 13/35; 266/43, 39; 264/30; 106/59, 57, 58, 60, 63, 66; 75/95; 164/72, 138

[56] References Cited
UNITED STATES PATENTS

| | | | |
|---|---|---|---|
| 2,069,903 | 2/1937 | Soyck | 106/57 X |
| 2,757,219 | 7/1956 | Clough et al. | 13/35 |
| 2,809,126 | 10/1957 | Murphy et al. | 117/169 R |
| 2,947,114 | 8/1960 | Hill | 266/39 X |
| 3,079,452 | 2/1963 | Copin et al. | 106/57 X |
| 3,303,032 | 2/1967 | Holt et al. | 106/57 |
| 3,492,383 | 1/1970 | Heimgartner | 264/30 |
| 3,533,815 | 10/1970 | Baldwin | 106/57 |
| 3,737,489 | 6/1973 | Murton | 264/30 |

*Primary Examiner*—William D. Martin
*Assistant Examiner*—Stuart D. Frenkel
*Attorney, Agent, or Firm*—Stanley J. Price, Jr.

[57] ABSTRACT

A coating composition is provided for coating a steel form which is to be used in a coreless induction furnace. The composition includes as essential ingredients compounds selected from the groups consisting of chromium oxide, zirconium oxide and olivines. The coating is applied to the exterior surface of a steel form. The coated steel form thereafter is employed in a coreless induction furnace. A heat of molten metal is developed within the form during which heat the metal form itself melts and the coating combines with the silica within the coreless electric furnace to form a hard, glassy cavity which will resist chemical reactions from metal and slag and temperatures above 3,000°F.

3 Claims, 1 Drawing Figure

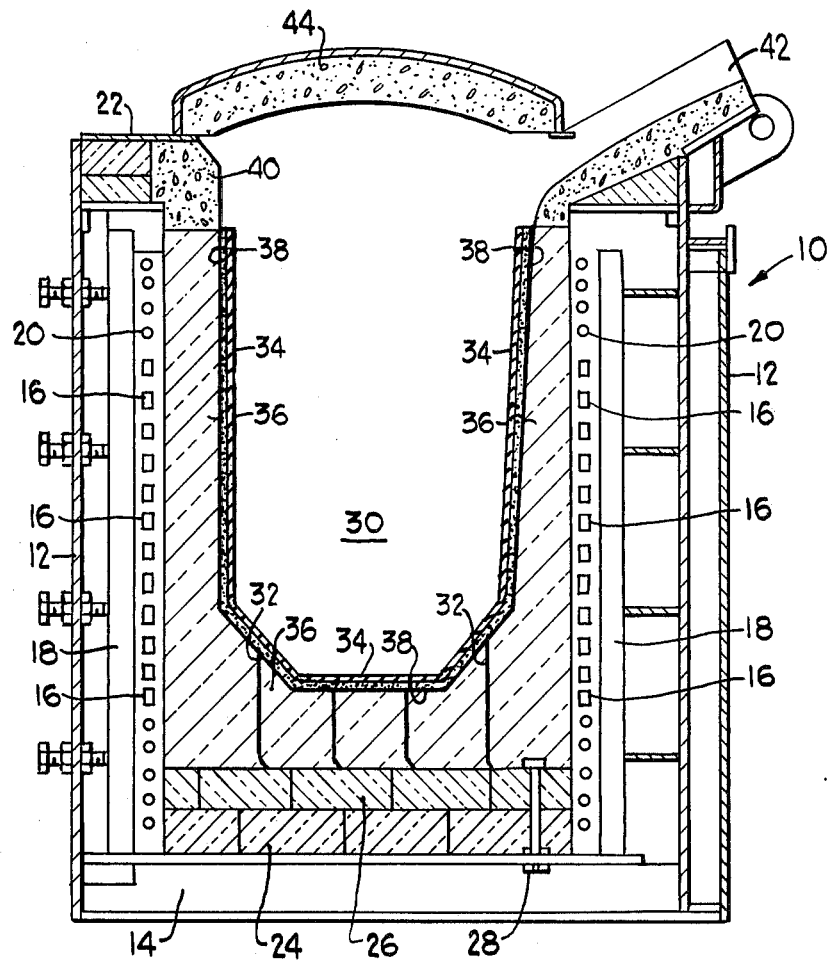

3,916,047

COATED STEEL FORM FOR USE IN A CORELESS INDUCTION FURNACE

BACKGROUND OF THE INVENTION

1. Field of the Invention

The invention relates to coreless induction furnaces and more particularly to a coated metal form which is used in such furnaces.

2. Description of the Prior Art

Heretofore the coreless induction furnaces have employed steel forms which are mounted in a housing and surrounded by a silica refractory. Induction heating is applied to the form, which is filled with iron, usually scrap iron, to cause the iron to melt. The temperature also causes the form to melt and creates fusion of the silica refractory immediately surrounding the form. The fused refractory forms a hard glazed glassy surface. It is possible to re-use such silica linings only a limited number of times because the silica refractory cannot resist temperatures in excess of about 2,840°F. and are subject to wear by abrasion and chemical reactions.

It has been proposed to employ a higher melting oxide as the filler material around the form. The cost of filling the entire cavity with such higher melting oxides has been prohibitive, and the straight line coefficient of expansion of these oxides also makes them unsuitable.

SUMMARY OF THE INVENTION

According to the present invention, I provide a novel coating composition which can be painted by brush or sprayed onto the entire exterior surface of a steel form which is intended for use in a coreless induction furnace. The coating is applied in thicknesses of about ⅛ to 2 inches. The coating consists, when dried, of moisture-free metal oxides of chromium or zirconium, or olivines. Some boric acid is also included as a binding mechanism. Preferably, some alkaline metal earth carbonate such as calcium carbonate also is included. The coating composition is provided in a volatile nonaqueous, noncombustible solvent, such as methylene chloride.

The coated form is inserted within a housing for a coreless induction furnace. Thereafter silica refractory is poured into the annular space between the form and the housing. The silica is in complete and total contact with the coating of this invention. Subsequently, when a charge of metal, such as metal scrap, is introduced into the form, the metal melts, the form melts and the coating of this invention fuses and combines with silica to form a temperature resistant, strong glassy cavity which can be used repeatedly in the housing for additional charges of metal.

A principal object of this invention is to provide a coating composition which can be painted by brush or spray to the outside of a form which is intended to be used in a coreless induction furnace.

Another object is to provide a steel form for use in a coreless induction furnace, the form containing a coating of a refractory composition including compounds selected from the class consisting of chromium oxide, zirconium oxide and olivines.

A further object of the invention is to provide a method for preparing a strong temperature resistant, glassy cavity within a coreless induction furnace to permit multiple uses of the cavity without replacement.

BRIEF DESCRIPTION OF THE DRAWING

The FIGURE illustrates in cross section a schematic representation of a typical coreless induction furnace employing the improved form of this invention.

DESCRIPTION OF THE PREFERRED EMBODIMENTS

Coreless induction furnaces are employed for heating metals to prepare iron by melting all of the metal ingredients in the charge. The source of heat is electrical induction obtained by line frequency electrical energy which is applied to a primary coil of copper conductors. The molten charge itself serves as the secondary winding of a theoretical transformer having a single turn. Thus, essentially all of the electrical energy is transformed into heat at the core of the furnace. In general, coreless electrical furnaces range in size from about 500 pounds to about 120,000 pounds capacity.

Typically, as shown in the FIGURE, the coreless induction furnace generally designated by the numeral 10 has an outer metallic supporting structure 12 secured to a base member 14. The copper induction coils or conductors 16 are suitably mounted in a cylindrical coil coating 18 and cooling coils 20 are mounted in the same coil coating above the induction coils 16 and adjacent the top of the furnace 22.

A layer of insulating brick 24 is positioned on the base 14 within the cylindrical coil coating 18 and a layer of fire brick 26 is positioned on top of the insulating brick 24. A leak detector 28 extends upwardly through the insulating brick and fire brick into the cavity 30 formed by the coil coating 18. Ground wires 32 extend upwardly in the cavity 30.

A steel form 34 is positioned in the cavity 30 and is embedded in a mass 36 of silica refractory. The silica refractory 36 is positioned between the steel form 34 and the induction coils 16 to electrically insulate the form 34 from the induction coils 16. A coating 38 is applied over substantially the entire surface of the form 34 and is in intimate contact with the silica refractory 36. A top cap 40 is positioned on the silica refractory and has a pouring spout 42 formed therein. A lid 44 is positioned over the top cap 40 to close the cavity 30 during the melting of the iron therein.

During the operation of the coreless induction furnace, a charge of metal, such as scrap iron (not shown), is introduced into the interior of the form 34. Customarily, the form 34 is formed from steel having a thickness from about ¼ inch to about ⅜ inch. Typical steel forms 34 have a diameter from about 1 foot to 12 feet and a height from about 36 inches to about 20 feet. The dimensions of the form are related to the size of the furnace. In general, the forms 34 have a slight taper over their entire length and toward the bottom a taper of about 60° to 75°. In operation, the charge within the form 34 is heated by means of the induction heat from the primary coil conductors 16. When the temperature exceeds the melting temperature of the metal contents of the form 34, the metals melt and coalesce to form special purpose alloys for which induction furnaces are employed. Also, in the course of heating, the form 34 itself melts into the charge and becomes a constituent of the resulting alloy.

The high temperatures generated by the melting cause the coating 38 of this invention to fuse and form a high temperature resistant, strong glassy cavity. The coating 38 also combines with some of the silica refractory 36 which is in complete contact with the coating 38 to form a refractory coating for the cavity. Because the coating 38 of this invention forms a high temperature resistant refractory, the coreless induction furnace can be re-used repeatedly without requiring a replacement form.

The coating 38 is applied to the form 34 by brushing or spraying from a composition hereinafter to be described. The coating 38 preferably has a thickness from about ⅛ to about 2 inches. The coating 38 is moisture free.

A preferred coating has the following ingredients:
- 40 – 60 parts of a compound selected from the class consisting of chromium oxide, zirconium oxide and olivine;
- 40 – 60 parts of a volatile, noncombustible, nonaqueous solvent;
- 0.5 – 5 parts of an emulsifier for the solvent and the metal oxide;
- 0.5 – 2 parts of boric acid; and
- 0.1 – 1.0 parts of an alkaline earth metal carbonate.

The composition also preferably includes an emulsifier for improving the combination of the metal oxides of the coating with the silica oxide in the silica refractory within the furnace. Other emulsifying agents and blending agents might be employed. A typical blending agent might be an organic solvent such as xylene, which promotes the texture of a coating composition. The solvent preferably is one which volatilizes below about 60°C. and preferably is methylene chloride. The function of the boric acid is to bind together the metal oxides or metal silicate of the present coating composition with the silica refractory to form the desired refractory cavity within the furnace. A typical and preferred formulation for a coating composition contains the following ingredients:
- 47.0% by Wt. of a compound selected from the class of chromium oxide, zirconium oxide and olivine;
- 47% by Wt. methylene chloride;
- 1.4% by Wt. lithium hydroxy stearate;
- 1.4% mineralite, also known as mica;
- 1.0% boric acid;
- 0.9% xylene;
- 0.8% elvacite, an acrylic resin; and
- 0.5% bentone (powdered calcium carbonate).

The particles of the metal oxide or metal silicate selected from the class consisting of chromium oxide, zirconium oxide and olivine should be smaller than 5 mesh U.S. screen and can be very finely divided, capable of passing entirely through a 325 mesh U.S. screen. Preferably, the particles are provided in a spectrum of particle sizes to improve the packing characteristics of the coating.

The described composition is mixed and supplied in closed cans for use as a coating composition for the forms which are employed in induction furnaces.

The composition can also be applied to maintenance and repair of existing linings in coreless electric furnaces by painting, spraying or troweling the composition directly onto faults in the furnace lining. The coating also can be employed as an electrical and thermal insulator coating 18 for the primary electrical coil conductors 16.

The present coating and form can be used to extend the life of an existing furnace cavity. For example, after a furnace cavity formed in accordance with the present invention has been used for a number of metal heatings, the abrasion tends to reduce the thickness of the high-temperature metal oxide refractory. The resulting enlarged cavity will receive a new form coated with the composition of this invention. The new form can be inserted in the existing vitreous cavity to form a veneer of fresh, high-temperature resistant metal oxide over the inner lining of the cavity. In this manner the same cavity may be employed repeatedly without requiring replacement.

A further safety factor exists in the present coreless induction furnace when compared with prior art attempts to employ fillers consisting exclusively of zirconium oxide, aluminum oxide, chromium oxide and magnesium oxide. While these fillers were prohibitively expensive, they also had a further shortcoming in their linear coefficient of expansion with respect to temperature. Thus, when a crack or a fault is manifested in a lining, the crack tends to propagate throughout the entire mass with the result that molten metal is free to escape from the cavity.

In the present invention, the high-temperature metal oxide lining of the cavity is surrounded by a silica glass lining which has a differential coefficient of expansion characteristic curve. Silica glass tends to expand more or less uniformly up to about 1,200°F. Above 1,200°F. silica glass tends to be essentially non-expansive. Accordingly, any cracks developing in the high temperature refractory lining of the present cavity will not be propagated, but instead will be blocked by the less brittle silica glass surrounding the cavity.

According to the provisions of the patent statutes, I have now explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A steel form for use in a coreless induction furnace comprising a steel shell in the shape of a cup and having a thickness from about ⅛ to about ½ inch and having a refractory coating applied over the entire lower major portion of the exterior surface of the form, said coating having a thickness ranging from about ⅛ inch to about 2 inches and comprising a moisture-free coating containing between about,
   - 40 to 60 parts by weight of a compound selected from the group consisting of chromium oxide, zirconium oxide and olivine,
   - 0.5 – 5 parts by weight of an emulsifier,
   - 0.5 – 2 parts by weight of boric acid,
   - 0.1 – 1 part by weight of an alkaline earth metal carbonate.

2. The steel form of claim 1 wherein the alkaline earth metal carbonate is calcium carbonate.

3. The steel form of claim 1 wherein the said compound is in the form of particles having a size smaller than 5 mesh U.S. standard screen.

* * * * *